United States Patent [19]
Kelley et al.

[11] Patent Number: 5,318,500
[45] Date of Patent: Jun. 7, 1994

[54] METHOD FOR CONTROLLING INTERMITTENTLY DISCHARGED CENTRIFUGES

[75] Inventors: James J. Kelley, Indianapolis; Richard W. Shields, New Whiteland, both of Ind.

[73] Assignee: Eli Lilly and Company, Indianapolis, Ind.

[21] Appl. No.: 961,418

[22] Filed: Oct. 15, 1992

[51] Int. Cl.$^5$ .............................................. B01D 21/26
[52] U.S. Cl. ...................................... 494/37; 210/739
[58] Field of Search ........................................ 494/1–4, 494/10, 37, 56, 68, 70, 85; 210/109, 112, 113, 369, 739, 787

[56] References Cited

U.S. PATENT DOCUMENTS

| | | | |
|---|---|---|---|
| 3,701,469 | 10/1972 | Nilsson | 494/37 X |
| 3,750,940 | 8/1973 | Nilsson | 494/3 |
| 3,752,389 | 8/1973 | Nilsson | 494/1 X |
| 3,797,736 | 3/1974 | Gunnewig | 494/2 |
| 4,014,498 | 3/1977 | Broadwell et al. | 494/3 |

FOREIGN PATENT DOCUMENTS

| | | | |
|---|---|---|---|
| 2605218 | 9/1976 | Fed. Rep. of Germany | 494/3 |
| 689735 | 10/1979 | U.S.S.R. | 494/3 |

Primary Examiner—Harvey C. Hornsby
Assistant Examiner—Charles Cooley
Attorney, Agent, or Firm—Woodard, Emhardt, Naughton, Moriarty & McNett

[57] ABSTRACT

A method for controlling centrifuges to improve solid-liquid separations, and particularly to achieve desired or optimal solids concentration in the concentrate discharge, is described. The method utilizes mass and solids balances on the centrifuge, together with measured and/or specified values for variables in the balances and for operating conditions of the centrifuge. The system further provides for the measurement of mass or solids concentrations of the concentrate and/or centrate streams as input for a feedback control system which adjusts the shot duration, shot interval or feed rate to modify operation of the centrifuge.

2 Claims, 4 Drawing Sheets

METHOD FOR CONTROLLING INTERMITTENTLY DISCHARGED CENTRIFUGES

BACKGROUND OF THE INVENTION

1. Field of the Invention

The present invention relates to methods for controlling centrifuges to improve solid-liquid separations, and particularly to achieve desired or optimal solids concentration in the concentrate discharge.

2. Description of the Prior Art

In certain industrial processes, intermittently discharged disk-stack centrifuges are used to carry out solid-liquid separations. A single stream, the feed, consisting of a mixture of an insoluble, sedimentable solid phase and a liquid phase, is continuously delivered to the centrifuge. The sedimentable solid phase is separated from the non-sedimentable liquid phase on the disks within the spinning bowl, and is flung to the periphery of the inside of the bowl, where it accumulates. At discrete intervals, the bowl is opened momentarily and the accumulated solids are discharged from the bowl.

The discharged material is referred to as the concentrate, because it is enriched in solid phase relative to the feed. Another exit stream, the centrate, is deprived of the solid phase relative to the feed. The product of interest may be in the liquid phase, such as in the clarification of alcoholic beverages or industrial fermentations in which the product is secreted into the medium. Alternatively, the product may be in the solid, sedimentable phase, as when a highly-expressed recombinant protein forms inclusion bodies intracellularly.

The operational parameters of an intermittently discharged disk-stack centrifuge are feed flow rate, shot interval, and shot duration. The term "shot" is a colloquial expression for the discharge event, stemming from the noise made on discharge which is similar to the firing of a weapon. Feed flow rate is the rate at which the feed is conveyed into the machine. The shot interval is the length of time between discharges of the concentrate. The shot duration is the length of time the bowl is opened during a discharge. The feed flow rate determines the residence time of solid particles in a centrifuge and the rate at which solids and liquid enter the machine. The shot interval and shot duration together determine the rate of removal of solids, and to some extent influence the concentration of solids in the discharged material.

The degree to which the interdependent process objectives of yield, purification and concentration of solids in the discharge are achieved is a measure of the performance of the intermittently discharged disk-stack centrifuge. Yield is a measure of the amount of product leaving the centrifuge in the stream which will be processed further compared to the amount of product entering the centrifuge. Purity is the ratio of the concentration of the product in a stream to the concentration of something else in the stream, such as nonvolatile solids or protein. Purification is the ratio of the purity of the product in the stream which will be processed further, compared to the purity of the product in the feed stream. Purification is a measure of the degree of separation achieved in the centrifuge between product and contaminants.

The concentration of solids in the discharge is the performance variable most directly controllable via the operating parameters of the centrifuge. The process objectives of yield (for a liquid phase product) and purification (for a solid phase product) are not directly controllable, but depend somewhat on the concentration of solids in the discharged stream. For a liquid-phase product, the greater the proportion of the liquid that is discharged in the concentrate stream, the lower is the yield of product in the centrate stream. In order to maximize the yield, no liquid would be allowed to be discharged in the concentrate stream. However, if no liquid is included in the discharge, the resulting concentrate is a very thick paste that cannot be discharged. Thus, in order for the solids phase to be conveyed out of the machine at discharge, some volume of liquid must be discharged with the solids. Optimized performance with respect to yield for a liquid-phase product requires, then, that the amount of liquid discharged with the solids be just sufficient to prevent the discharged slurry from forming a paste that cannot be conveyed out of the machine. That is, the discharge should be just thin enough to be discharged efficiently.

To optimize the purification of a solid-phase product, the amount of liquid in the concentrate stream should be no more than is necessary to allow efficient discharge of the concentrate. This is because soluble material in the liquid will reduce purity. Achieving an optimal concentration of solids in the concentrate is essential for optimized centrifuge operation. Additionally, it is desirable to achieve a particular target solids concentration in the concentrate when the next processing step has a low tolerance for liquid, is limited in its volume handling capacity, or benefits from low solids concentration variability. In summary, good control of the solids (or liquid) content of the discharged stream is essential when the objectives are to optimize yield for a liquid-phase product, to optimize purification for a solid phase product, or to produce a discharge having a high solids concentration or a solids concentration in a narrow range.

In the past, the operating parameters to control the amount of liquid in the discharged concentrate were chosen empirically at the beginning of processing, and then altered during the separation in response to in-process measurements. The performance of the centrifuge during operation was monitored by periodically removing a sample of the concentrate stream and measuring the volumetric percentage of solids using a small centrifuge (a Gyro tester). If the volumetric percentage of solids in the discharge deviated from a target value, then the centrifuge operating parameters were varied by trial-and-error until the measurement came within a prescribed range of the target.

Sometimes this approach succeeded and the solids content of the concentrate met process expectations. Frequently, however, the process objective for solids content was not achieved, resulting in high variability in solids content and consistently suboptimal purification. The most important causes of this high variability were the imprecision in the in-process measurement of volumetric percent solids, and the lack of a model by which process objectives (solids content, yield, purification), the operational parameters of the centrifuge (feed flow rate, shot interval, and shot duration), in-process measurements, and characteristics of the feed stream could be related.

The present invention provides a method for controlling the centrifuge that greatly increases the likelihood of producing a concentrate discharge having a desired or optimal solids concentration. This method is based on mathematically sound mass balances and a model to relate process objectives, the operational parameters of the centrifuge, in-process measurements, and the characteristics of the feed stream.

SUMMARY OF THE INVENTION

Briefly describing one aspect of the present invention, there is provided a method for controlling an intermittently discharged centrifuge which receives a feed stream for solid-liquid separation into a centrate stream and a concentrate stream. The method utilizes mass and solids balances on the centrifuge, together with measured and/or specified values for variables in the balances and for operating conditions of the centrifuge. The system further provides for the measurement of mass or solids concentrations of the concentrate and/or centrate streams as input for a feedback control system which adjusts the shot duration, shot interval or feed rate to modify operation of the centrifuge.

It is an object of the present invention to provide a method for establishing and controlling operating conditions for an intermittently discharged centrifuge. A further object of the invention is to provide a method for optimizing a solid-liquid separation by a centrifuge, particularly in terms of yield, purity and purification.

Further object and advantages of the present invention will be apparent from the description of the preferred embodiment which follows.

DESCRIPTION OF THE PREFERRED EMBODIMENT

For the purposes of promoting an understanding of the principles of the invention, reference will now be made to the embodiment illustrated and specific language will be used to describe the same. It will nevertheless be understood that no limitation of the scope of the invention is thereby intended, such alterations, modifications and further applications of the principles of the invention as illustrated therein being contemplated as would normally occur to one skilled in the art to which the invention relates.

The present invention provides a method for controlling an intermittently discharged centrifuge. The method enhances the ability to control the centrifuge to provide a desired solid-liquid separation. As opposed to prior approaches, the method of the present invention uses a determination of actual and targeted conditions for start-up of the centrifuge, and then utilizes in-line measurements in a feedback control system to continually adjust the operation of the centrifuge to attain desired separation results. These in-line measurements provide information for determining non-optimal operation of the centrifuge, and for determining modifications of operating parameters to adjust the centrifuge to yield enhanced results.

The method of the present invention has wide application in view of its generalized approach to the control of solid-liquid separations by centrifugation. For any such system, the method is useful by measuring and controlling the mass and/or solids concentration of one or more of the discharge streams from the centrifuge. The nature of the mass balances involved and the number of degrees of freedom of such systems permit the concentration of solids in the concentrate (or in the centrate) to be controlled, based upon certain facile measurements made both before and during operation of the centrifuge.

Use of the present invention may be made with any intermittently-discharged centrifuge. These may include, for example, disk-stack centrifuges. Applications exist with respect to such diverse processes as those involved in mineral and oil mining, pulp and paper processing, beverage, chemical and pharmaceutical manufacture, metal and petroleum refining, waste water and sewage treatment, biotechnology, nuclear fuel production, and others. Examples of disk-stack centrifuges include centrifuges commercially available under the designations AX-213 (Alfa-Laval), and CS-35 (Westfalia).

In operation, the process objective of centrifugation is the isolation and purification of a desirable product by means of physically separating it from contaminants. The product of interest may be the non-sedimentable liquid phase, such as in the clarification of beverages (e.g., beer, wine), removal of biomass from fermentation broth (e.g., tetracycline, erythromycin, ethyl alcohol) and recovery of products from slurries of catalyst (e.g., fatty alcohol, organic polymer, and dye pigment synthesis). Alternatively, the valued product may be in the sedimentable phase, such as in recombinant bacteria (e.g., E. coli expressing heterologous proteins), in recovery of catalyst (hydrogen peroxide and caprolactam production) and in the concentration of synthetic rubber latex, to name a few examples.

The present method relies upon the measurement of certain values relating to the feed, centrate and/or concentrate streams for the centrifuge. Certain parameters, such as feed flow rate and mass per shot, may be initially established in accordance with standard operating principles for a given centrifuge. Based upon the foregoing measured and/or specified values, the shot interval and shot duration are determined. Once the centrifuge is in operation, measurements of various parameters are made periodically, and the centrifuge operation is varied in response thereto. Typically, the shot duration, shot interval and/or feed rate are controlled to adjust the operation of the centrifuge.

The invention is useful in a wide variety of solid-liquid separations. Following is a general discussion of the inventive method, with reference made to the process as exemplified by its use in controlling the separation of intact microorganisms from growth medium (cell harvest). The aspects and features of the present invention will therefore be specifically described with respect to this process. However, it will be appreciated that the method has broader applications as set forth hereafter.

In a broad sense, a basis for the method of the present invention is the use of mass and solids balances on the operation of the centrifuge. A total mass balance and a total non-volatile solids balance can be written for a centrifuge as follows:

Total Mass Balance: $M_1 = M_2 + M_3$         (A1)

Total Solids Balance: $S_1 = S_2 + S_3$         (A2)

in which $M_1$, $M_2$ and $M_3$ are the total mass (kg) of the feed, centrate and concentrate, respectively; and in which $S_1$, $S_2$ and $S_3$ are the total nonvolatile solids (kg) in the feed, centrate and concentrate, respectively. The solids balance may be rewritten in terms of the concentration (weight/weight) of the solids to the total mass, on the basis that $S_i = s_i M_i$, in which $s_i$ is the solids concentration of stream i (kg/kg). Substitution of this relationship into A2 yields the following:

Total Solids Balance: $s_1 M_1 = s_2 M_2 + s_3 M_3$         (A3)

The relationships in equations A1 and A3 can be made determinate by establishing a sufficient number of the indicated variables. Thus, A1 and A3 have four degrees of freedom (two equations, six variables), and may be made determinate by the measurement or selection of values for four of the variables. Since the feed material is available, both $M_1$ and $s_1$ can be measured. The relationships can then be made determinate by measuring or selecting one of the following:

(1) both the centrate solids concentration $s_2$ and the concentrate solids concentration $s_3$; or (2) one of the centrate mass $M_2$ or the concentrate mass $M_3$, and one of the centrate solids concentration $s_2$ or the concentrate solids concentration $s_3$.

In most cases the investigator will choose to select a value of $s_3$ such that the concentrate is just thin enough to allow discharge from the machine. Having established values for (1) or (2), the system is determinate, and further operating parameters for the centrifuge are determined. The initial feed rate Q and the target mass per shot are established. From all of the foregoing, the initial shot duration and initial shot interval are determined. The centrifuge is then started, and measurements of at least one of $M_2$, $M_3$, $s_2$ and $s_3$ are used to adjust operation of the centrifuge. Control of one of these parameters at the values set by the equations A1 and A3 results in fixing $s_3$ to the selected value. A desirable feature of the present invention is that it obviates the need to measure solids concentrations ($s_2$ or $s_3$) during operation of the centrifuge. Instead, readily measured masses ($M_2$ or $M_3$) can be used to control the centrifuge. Operating parameters such as shot duration, shot interval and/or feed rate are adjusted to modify the centrifuge operation.

More specifically, the present invention involves a multi-step process including the measurement or specification or various parameters in the above mass and solids balances and for operation of the centrifuge. These determinations are made both prior to and during the operation of the centrifuge. Values determined prior to starting the centrifuge are used to establish initial or target values, such as for the solids concentration of the concentrate, shot mass, shot duration and shot interval. Measurements made during operation of the centrifuge are used to adjust operating parameters for the centrifuge, typically shot duration, shot interval and feed rate.

A first step in performing the inventive method is to establish the relationships set forth in the mass and solids balances. As indicated, six variables exist for the two equations A1 and A3. Two of these values, namely $M_1$ and $s_1$, are determinable by direct measurements on the feed material. $M_1$ is simply the total mass of material to be processed by the centrifuge. $s_1$ is the (average) nonvolatile solids concentration of the feed material, and is readily determined by drying a known quantity (kg) of a sample of the material to obtain a value (kg) for the nonvolatile solids in the sample. This yields a weight ratio (kg/kg) for the nonvolatile solids in the feed material.

It is then necessary to establish values for at least two additional variables in the equations A1 and A3. Specifically, at least one of the following two sets of values must be determined: (1) both the centrate solids concentration $s_2$ and the concentrate solids concentration $s_3$; or (2) one of the centrate mass $M_2$ or the concentrate mass $M_3$, and one of the centrate solids concentration $s_2$ or the concentrate solids concentration $s_3$.

In certain instances, it will be possible to simulate the centrate material, for example by batch centrifuging a sample of the feed material and analyzing the supernatant fluid as an equivalent to the centrate to be received from the centrifuge. When possible, this approach is a preferred method to obtaining a value for $s_2$. Alternatively, it may be possible to estimate a value for $s_2$. Alternatively, it may be possible to estimate a value for $s_2$, which may be used for start-up purposes, although this is less desirable.

Preferably, the value of $s_3$ is also obtained as one of the determined values. This is particularly true where the concentrate is the desired product stream, and a preferred concentration may be targeted. This value may be established based upon trial and error or past operation of the centrifuge. That is, it can be determined, and will generally be within the skill in the art to specify, what is a suitable solids concentration in the concentrate for a given centrifuge and feed material. For example, for a cell harvest feed, a suitable target concentration of solids in the concentrate is typically in the range of 20–24% for E. coli. Therefore, a value for $s_3$ is preferably specified based upon generally known principles and considerations with respect to the feed material and the centrifuge being used. In addition, it may be possible to simulate the solids concentration in the concentrate stream, although this is considerably more difficult than for the centrate.

The masses of the concentrate and/or centrate streams may also be determined or specified. However, these values are more typically established based upon determining values for $s_2$ and $s_3$, and then calculating the values for $M_2$ and $M_3$ from the solids and mass balances.

With two additional values having been established in accordance with the criteria of alternatives (1) and (2), it is then possible to solve the mass and solids balances. This yields a figure for the target total mass ($M_3$) of the concentrate. The target mass per shot, flow rate, total time of operation, number of shots, and the shot interval for start-up are determinable. In addition, an algebraic algorithm is used to calculate the initial shot duration.

The target mass per shot of the concentrate stream (or centrate stream) is determined, based upon known operating characteristics of the centrifuge. This value may be selected based upon prescribed operating conditions of the centrifuge, by trial and error, or by specific analysis of the centrifuge characteristics with the particular feed material. By way of example, it has been found that good performance is realized when the target for mass discharged per shot when operating with a cell harvest (E. coli) is in the range of 100 to 200 percent of the solids holding capacity of the bowl. However, this range is not universal and is not to be considered limiting of the invention. Rather, determination of a suitable mass per shot is well within the skill in the art in accordance with the methods described for making this determination.

Figure 1:
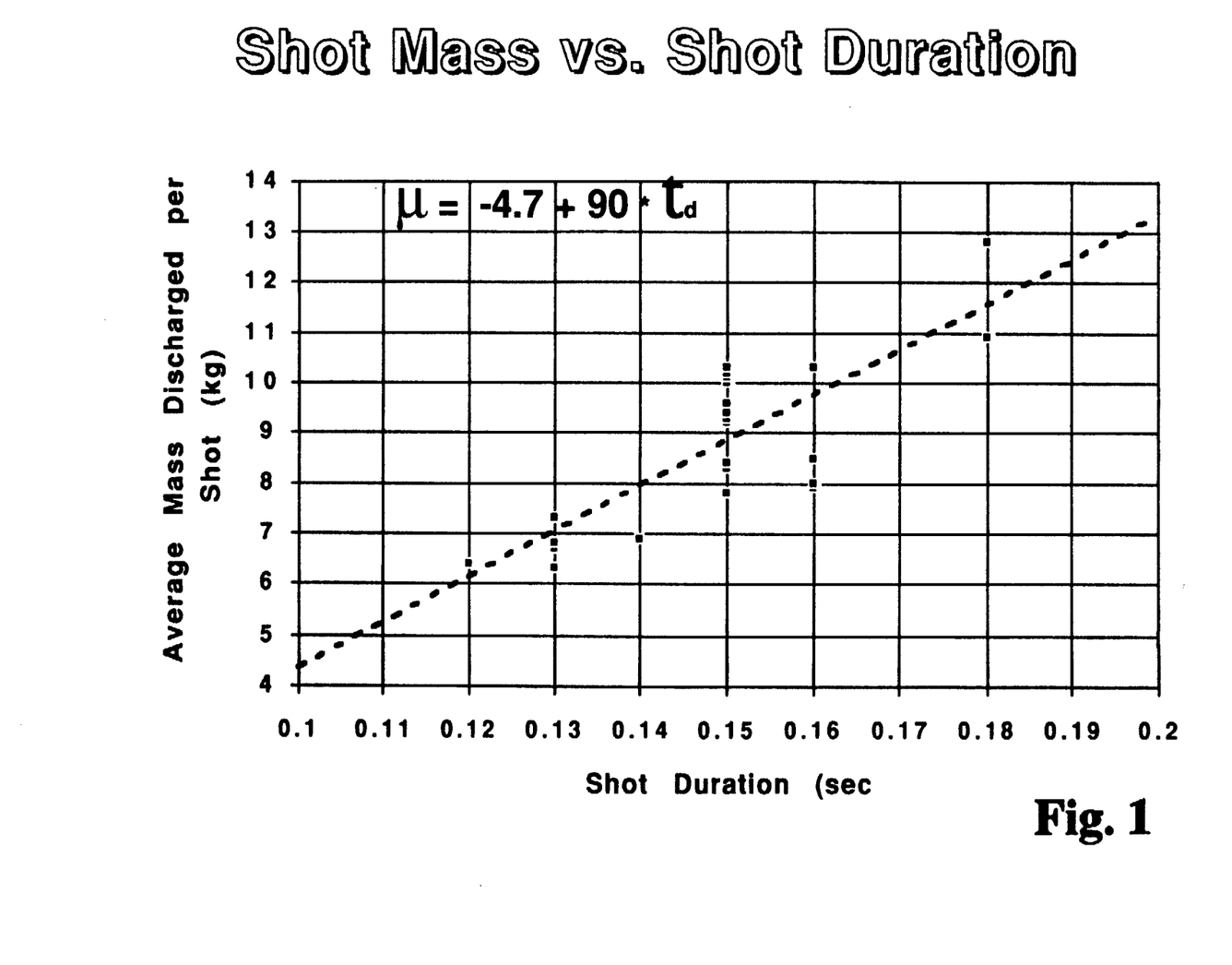
FIG. 1 is a graph showing the average mass discharged per shot versus the shot duration in the operation of the present invention.

The initial shot duration is also established based upon the operating characteristics of the centrifuge for the feed material. This value is preferably established based upon runs of the centrifuge using different shot durations. In each instance, the mass of concentrate per shot is measured, and a graph is prepared of mass per shot versus shot duration. As shown for example in FIG. 1, a relationship between mass per shot and shot duration is determined. Based upon these results, the shot duration for a given targeted mass per shot is readily determined. For example, pursuant to FIG. 1, a targeted mass per shot of 8 kg would call for a shot duration of 0.14 seconds. More generally, the shot duration ($t_d$) may be determined from the following relationship:

$$t_d = (\mu_t - \mu_0)/\beta$$

in which $\mu_t$ is the target mass per shot, $\mu_0$ is the intercept of a regression line relating mass discharged per shot and shot duration (kg), and $\beta$ is the slope of the regression line.

The selected centrifuge is operated generally in accordance with conventional procedures and within normal operating conditions. Such centrifuges will typically have feed rate limits that are considered optimal, as well as identified solids capacities. The feed flow rate (Q, kg/sec) is specified and a flow control system is used to maintain the flow rate at the specified value. In making this specification, throughput, yield and purification goals are factors. Considerations which may be relevant in selecting throughput are the stability of the product against either chemical modification or microbiological contamination, the volume of product which needs to be processed within a defined period, and the two other process objectives, yield and purification.

The appearance of any solid phase in the centrate stream usually represents a contamination which adversely affects the purification for a product in the liquid phase. For a product in the solid phase, a loss of solid phase to the centrate stream adversely affects the yield. An idealized concept of the relation of solid phase in the centrate and feed flow rate is that, for a particular machine, operating speed, feed composition, and particle size, no particles having diameters greater than a given particle size will be lost in the centrate stream when the feed flow rate is less than a certain rate. Above such rate, the number of solid particles not sedimented increases with increasing feed flow rate.

The feed flow rate preferably gives a high throughput of material without being so high as to reach a threshold at which unacceptable loss of solids into the centrate stream occurs, barring other considerations to the contrary. The yield of a solid-phase product and the purification of a liquid-phase product will be independent of feed flow rates at rates below the threshold. Above the threshold, feed flow rate determines the degree of purification of a liquid phase product and the yield of a solid-phase product. As a corollary, if the feed rate which meets the foregoing criterion does not result in acceptable throughput, then the centrifuge is not large enough.

The total process time (t) for the batch is calculated from the relationship:

$$t = M_1/Q$$

The number of shots (N) in the batch run is then calculated as follows:

$$N = M_3/\mu_t$$

Finally, the shot interval ($t_i$) is obtained from the relationship:

$$t_i = t/N$$

At this point, all necessary operating parameters for the centrifuge have been established. In particular, the feed rate, shot interval and shot duration have been set. The centrifuge is therefore started and processing initiated for the feed material using these conditions. As a further feature of the present invention, a method is also provided for monitoring and evaluating the performance of the separation process, and for making adjustments to enhance the operation.

Give the established relationships based on the mass and solids balances, it is possible to apply a feedback control system to enhance the performance of the centrifuge. Various feedback systems may be employed. In general, one or more measurements of $M_2$, $M_3$, $s_2$ and/or $s_3$ are taken in-line during operation of the centrifuge. This information is then used to determine non-optimal operation of the centrifuge and to determine a modification to at least one of the operating parameters for the centrifuge to improve performance. Typically, at least one of the shot duration, shot interval and feed rate are adjusted in response to the measurements and resulting determinations of the control system.

A feedback process control algorithm for controlling the centrifuge is employed. Although several parameters of the centrate or concentrate streams could be employed, it is preferable to use the mass of the concentrate ($M_i$). This value is most easily determined, since it represents a smaller number than for the centrate mass, and is directly measurable, as opposed to the solids concentrations. Moreover, this figure will be of particular interest in those cases in which the concentrate is the desired product. It is a distinguishing feature of the present invention that the feedback control system operates on the basis of a mass measurement, rather than a concentration determination.

After each discharge from the centrifuge, the amount of mass discharged is measured. The shot duration, shot interval and/or feed rate are then altered to maintain the total mass discharged within close tolerance to the specified target mass. The particular control algorithm used in not critical to the invention, and may be established based upon a variety of criteria. For example, the process control algorithm may involve an error signal composed of differences from the set point which are proportional only, proportional and integral, proportional, integral and differential, or integral only. A moving setpoint of accumulated mass of concentrate is typically used.

In accordance with one control algorithm, the mass of accumulated concentrate and the mass discharged at the last shot are calculated and an error signal (E) accounting for both proportional and integral errors is calculated as follows:

$$E_j = (\mu_j - \mu_t) + \sum_{j=1}^{N} (\mu_j - \mu_t)$$

Control action is initiated if the absolute value of the error signal $E_j$ is higher than a prescribed value.

The control action may involve adjustment of the shot duration, shot interval and/or feed rate. In particular, controlling the shot duration is most preferred, with control of the shot interval being next most preferred. In general, either increasing the shot duration or decreasing the shot interval will increase the concentrate flow rate. In a preferred method, the shot duration is modified when the mass per shot varied from the target mass per shot by more than 1 kg, i.e. more than about 12.5%.

In a particular embodiment of the present invention, the control feedback differs based upon whether the solids concentration in the centrate has been simulated or not. For example, when $s_2$ has been simulated, then $M_3$ is controlled preferably with the shot duration. However, when $s_2$ is not simulated, then preferably shot duration is used to control $M_3$ and the shot interval is used to control $s_3$. In any event, these control approaches are indicated simply as being preferred, whereas the concept of the present invention generally contemplates the control of any one or more of the shot duration, the shot interval and the feed rate.

The method of the present invention has proved to be highly useful in the control of intermittently discharged centrifuges, providing good results in terms of yield, purity and purification. Results have given consistent product. The following specific examples further demonstrate the usefulness of the present invention. It will be understood, however, that these are exemplary only, and are not limiting of the present invention.

EXAMPLE 1

The foregoing method was used in the solid-liquid separation of a whole broth (*E. coli*) from a fermenter. The process involved the separation of microbial cells from fermentation broth. A sample (10 mL) of the feed stock was submitted to accelerated sedimentation in a laboratory centrifuge (2000 g × 10 min.). Measurements of the concentration of nonvolatile solids were obtained using a microwave dryer balance (e.g., CEM, Model AVP-MC). Alternatively, a vacuum dryer may be used. Further, the process may be operated on the basis of non-dissolved, rather than non-volatile solids, with little error normally being introduced. The initial broth was measured and found to contain 5.45% (kg/L) solids. The centrate solids ($s_2$) were 3.14%. Total volume of the feed material was 4650 L.

Based upon operating characteristics of the centrifuge, a feed flow rate (Q) was set at 40 LPM. The target shot mass was kg. Target solids were specified at 22%. Following the procedures described, the shot interval was set for 1.63 min, and the initial shot duration was 0.13 sec.

Figure 2:
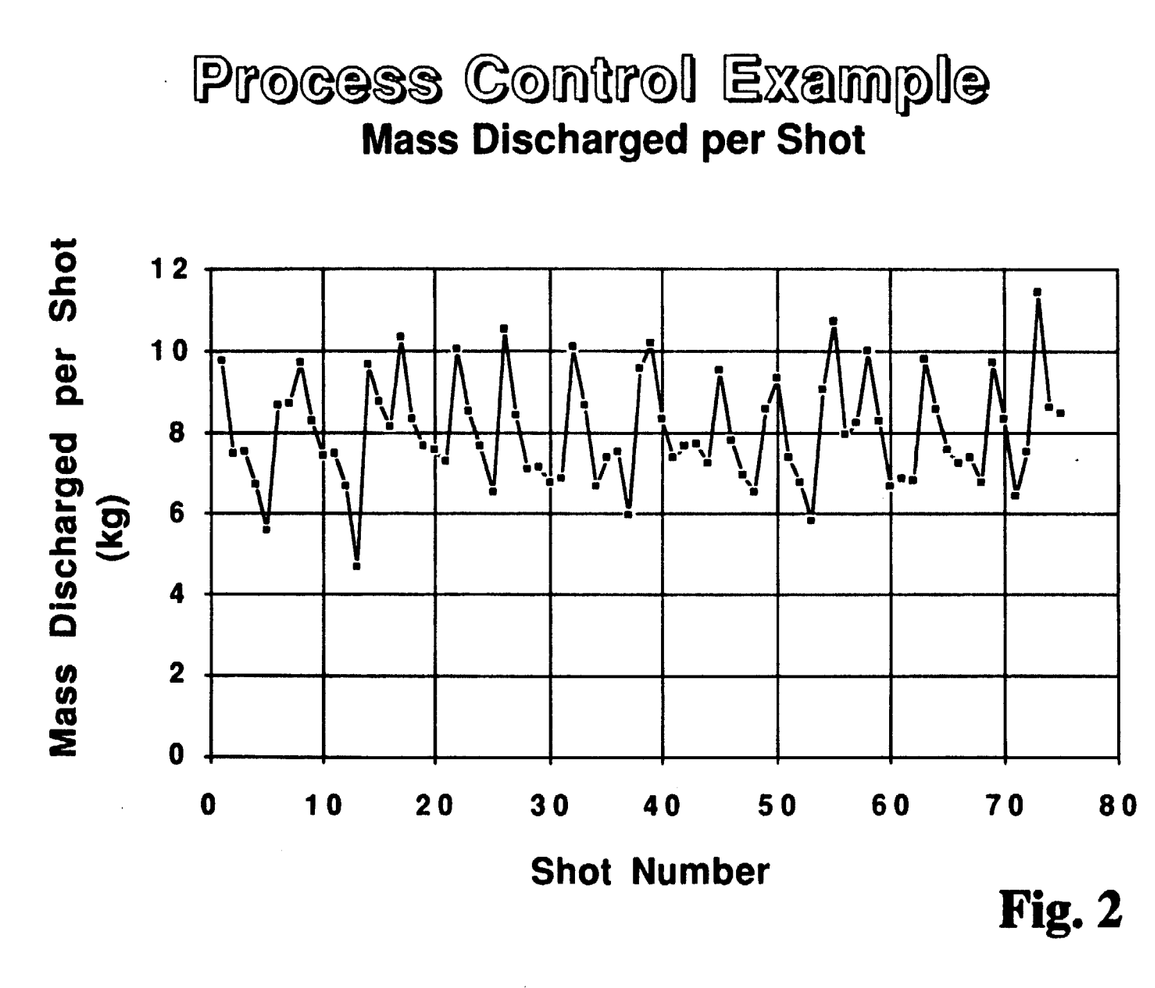
FIG. 2 is a graph showing the mass discharged per shot versus the shot number in the operation of the present invention.
Figure 3:
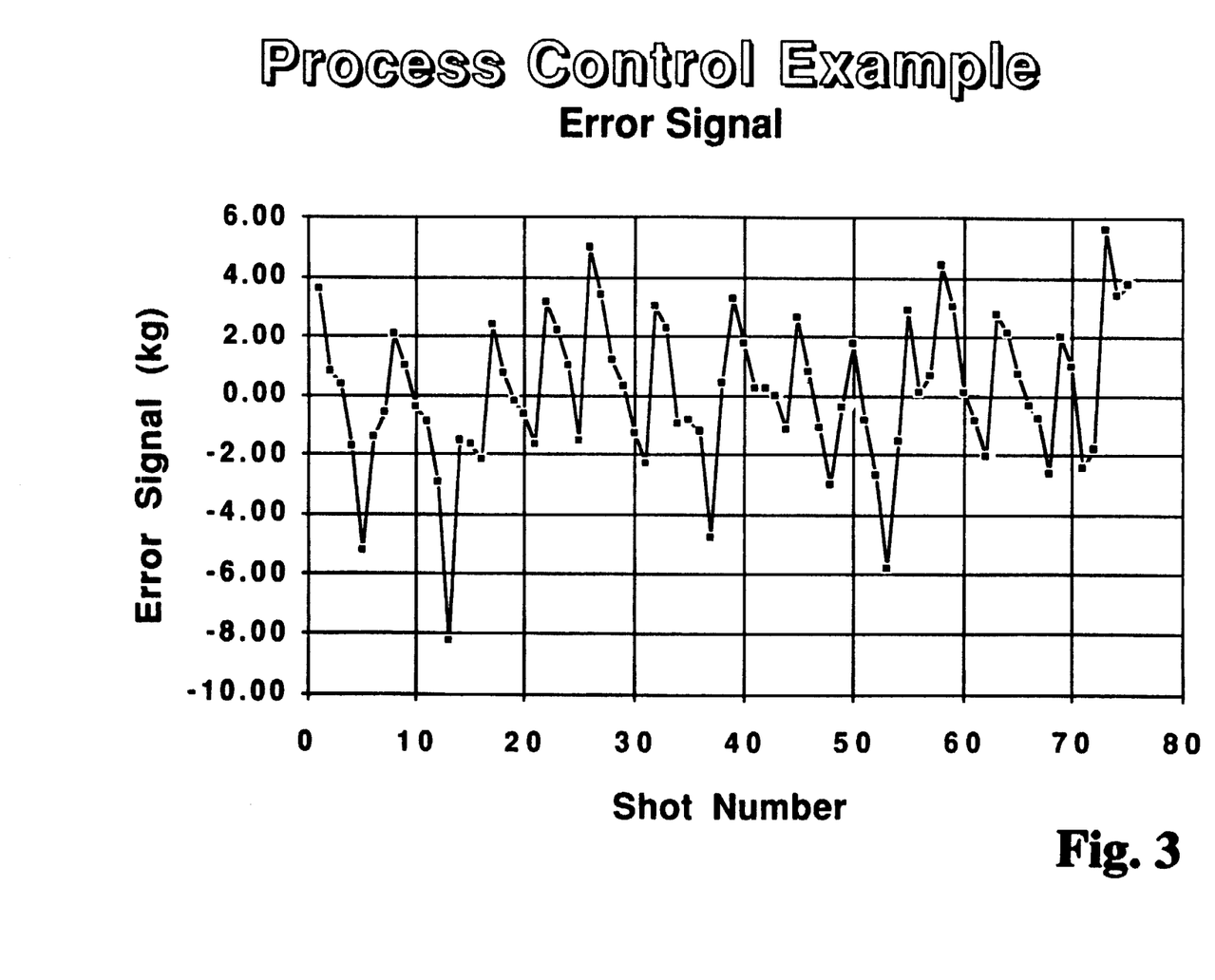
FIG. 3 is a graph showing the error signal versus shot number used in the operation of the present invention.
Figure 4:
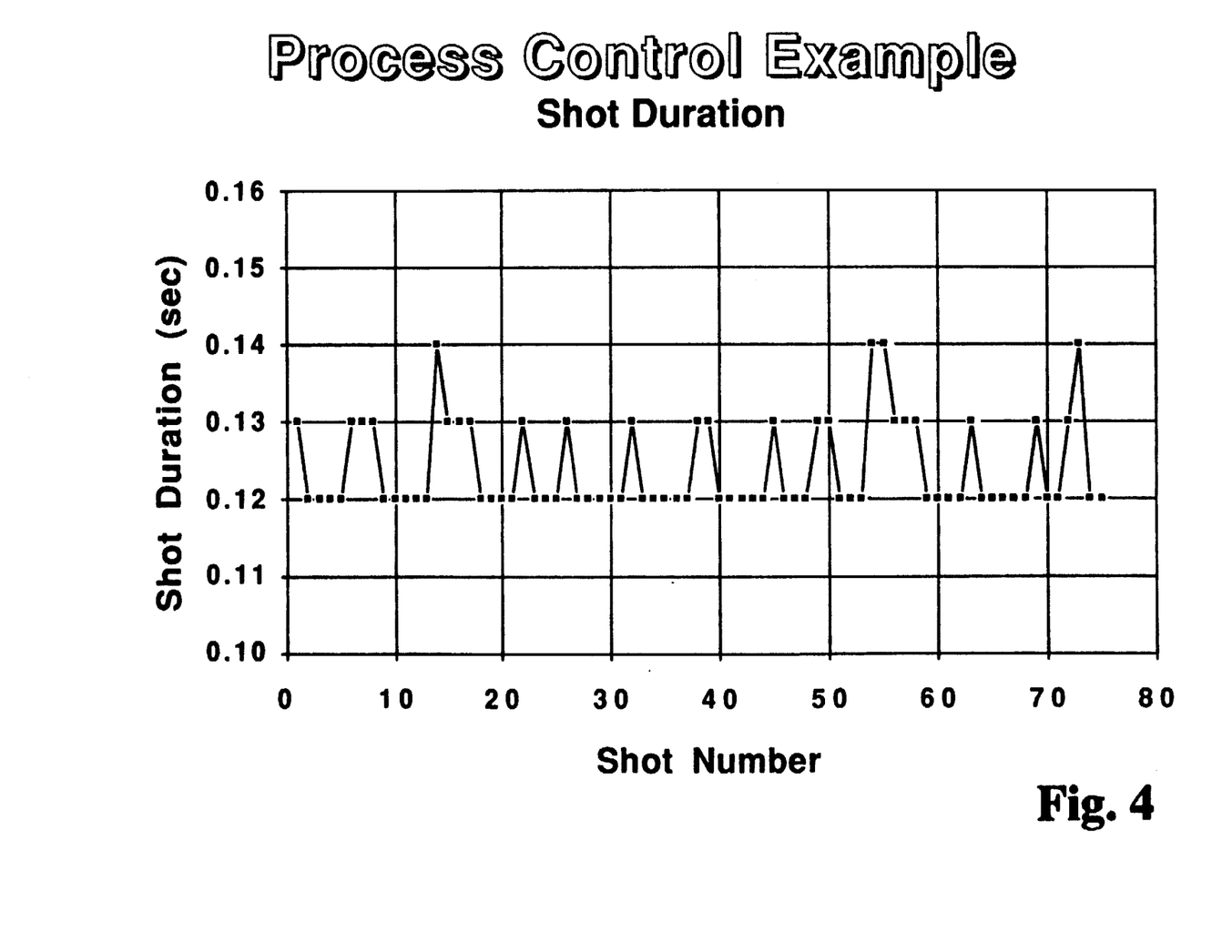
FIG. 4 is a graph showing the shot duration versus shot number for an operative example of the present invention.

The stock material was subjected to centrifugation using an Alfa-Laval AX-213 disk-stack centrifuge. Upon starting the centrifuge, measurements were made for the mass of each shot received. A feedback control algorithm was used as set forth above, with the shot duration being adjusted, typically in increments of 0.01 sec, in response to the measured mass of each shot. The measured mass discharges per shot are shown in FIG. 2, and the error signals determined during the process are graphed in FIG. 3. The shot durations were varied in response to the error signals in accordance with the prescribed control algorithm, and the shot durations during the run are shown in FIG. 4.

The results of the centrifugation process are set forth below in Table 1. The concentrate mass, solids concentration in the concentrate ($s_3$), and mass per shot were very close to those predicted. Further, the purification was determined to nearly two-fold, as predicted. The process was also found to provide more limited variations in solids percentage, indicating that the results are more reliable and reproducible. The solids percentage, purity and yield were all found to be good.

TABLE 1

|  | Predicted | Obtained |
| --- | --- | --- |
| Concentrate Mass ($M_3$, kg) | 570 | 574 |
| Purification (fold) | 2.02 | 1.96 |
| Number of Shots ($N_s$) | 71 | 72 |
| Run duration (t, min) | 116 | 119 |
|  | Target | Obtained |
| Solids Concentration ($s_3$) | 22.0 | 21.4 |
| Mass per shot | 8.00 | 7.97 |

In procedures using the control method of the present invention in comparison to prior art trial and error methods, the present method has been shown to provide superior results. For example, average solids concentrations for comparable runs without the present strategy have varied in the range of 7–23%, with an average of 15% solids. By comparison, the same runs conducted in accordance with the present invention have averaged 17% solids in the concentrate, with a variation ranging only from 15% to 19%.

EXAMPLE 2

The process of Example 1 was repeated was repeated for a whole broth having a total volume of 4700 L. The solids concentration of the feed broth was 5.73%, and for the centrate was 3.40%. The feed rate was set at 40 LPM, and the target shot mass and concentrate solids percentage were specified at 8.00 kg and 20%, respectively. The shot interval was set at 0.92 min, and the initial shot duration was determined to be 0.13 sec.

The centrifugation process was initiated, and the mass of concentrate was monitored. This was accomplished by delivering the concentrate to a drum on a scale, and the accumulated mass (kg) was noted, the incremental differences indicating the mass per shot. Set forth in Table 2 is a tabulation of the shot duration ("Actual Sd") for each shot #, the accumulated drum weight ("Drum Wt."), and the calculated duration for the next shot ("Next Sd") using the previously-described control algorithm. The process performed well. The separation run lasted for 118 minutes, involving 82 shots. The resulting purification was 2.041-fold, and the concentrate volume was 660 L.

EXAMPLE 3

A process involving separation of inclusion bodies (granules) from soluble cell components and non-sedimentable cell particles following homogenization of a whole broth (E. coli) was run. The foregoing process was repeated, except that both the shot duration and the shot interval were adjusted during the course of the separation process. For this example, the feed material had a total volume of 5300 L. The solids concentration of the feed material was 2.25%, and for the centrate was 1.45%. The feed rate was set at 40 LPM, and the target shot mass and concentrate solids percentage were specified at 6.00 kg and 22%, respectively. The initial shot interval was set at 3.35 min, and the initial shot duration was determined to be 0.13 sec.

The centrifugation process was initiated, and the mass of concentrate was monitored. The accumulated mass (kg) was noted, with the incremental differences indicating the mass per shot. Set forth in Table 3 is a tabulation of the shot duration ("Actual Sd") for each shot #, the shot interval ("Actual Si") between each successive shot, and the accumulated drum weight ("Drum Wt."). In the course of the process, the concentration of solids in the concentrate stream ("Sample Concent. Dry Wt.), as a weight percent, was determined. This data, together with the previously-described control algorithm and relationships, were used to determine subsequent shot durations and intervals. The shot durations were recalculated following each shot, while the shot intervals were adjusted after every five shots. Table 3 sets forth the calculated duration for the next shot ("Next Sd") and the calculated interval until the next shot ("Next Si").

The process performed well. The separation run lasted for 133 minutes, involving 34 shots. The resulting purification was 2.627-fold, and the concentrate volume was 206 L.

EXAMPLE 4

The process of Example 3 was repeated, except that the solids concentration in the centrate was estimated based upon past experience. The volume of the feed material was 4100 L and the feed rate was set at 40 LPM based upon operating characteristics of the centrifuge. The concentration of solids in the feed material was measured at 1.04% (wt/wt), and the concentration of solids in the concentrate was estimated at 0.030%. The target shot mass was 6.00 kg, and the target concentration of solids in the concentrate was 20%. The initial shot interval was 3.49 min, and the initial shot duration was 0.11 sec. The pertinent data for the run is provided in Table 4. The run involved 25 shots over 103 minutes. The final concentrate volume was 154 L and the resulting purification was 1.384-fold. The process provided excellent results for the separation process.

EXAMPLE 5

The process of the present invention is also useful when utilizing variations of the foregoing processes, in accordance with procedures previously described. For example, separations run with other control algorithms but based upon the indicated balances and relationships yield desirable results.

While the invention has been illustrated and described in the foregoing description, the same is to be considered as illustrative and not restrictive in character, it being understood that only the preferred embodiment has been shown and described and that all changes and modifications that come within the spirit of the invention are desired to be protected.

TABLE 2

| SHOT # | TIME | ACTUAL Sd | DRUM WT. | NEXT Sd |
|---|---|---|---|---|
| Drum A Weight Empty → | | | 73.4 | |
| 1 | | 0.13 | 78.0 | 0.14 |
| 2 | | 0.14 | 82.2 | 0.15 |

TABLE 2-continued

| SHOT # | TIME | ACTUAL Sd | DRUM WT. | NEXT Sd |
|---|---|---|---|---|
| 3 | | 0.15 | 87.6 | 0.16 |
| 4 | | 0.16 | 94.2 | 0.17 |
| 5 | | 0.17 | 102.2 | 0.18 |
| 6 | | 0.18 | 112.0 | 0.19 |
| 7 | | 0.19 | 122.8 | 0.20 |
| 8 | | 0.20 | 133.6 | 0.21 |
| 9 | | 0.21 | 146.8 | 0.20 |
| 10 | | 0.20 | 158.0 | 0.19 |
| 11 | | 0.19 | 167.6 | 0.18 |
| 12 | | 0.18 | 177.2 | 0.17 |
| 13 | | 0.17 | 184.6 | 0.16 |
| 14 | | 0.16 | 191.8 | 0.15 |
| 15 | | 0.15 | 198.4 | 0.14 |
| 16 | | 0.14 | 203.8 | 0.14 |
| 17 | | 0.14 | 208.6 | 0.15 |
| 18 | | 0.15 | 214.2 | 0.16 |
| 19 | | 0.15 | 218.8 | 0.16 |
| 20 | | 0.16 | 224.8 | 0.17 |
| 21 | | 0.17 | 231.8 | 0.18 |
| 22 | | 0.18 | 239.6 | 0.19 |
| 23 | | 0.19 | 249.6 | 0.20 |
| 24 | | 0.20 | 261.6 | 0.20 |
| 25 | | 0.20 | 272.0 | 0.20 |
| Drum B Weight Empty → | | | 63.6 | |
| 26 | | 0.20 | 75.6 | 0.19 |
| 27 | | 0.19 | 86.0 | 0.18 |
| 28 | | 0.18 | 95.2 | 0.17 |
| 29 | | 0.17 | 102.4 | 0.16 |
| 30 | | 0.16 | 108.4 | 0.15 |
| 31 | | 0.15 | 114.0 | 0.15 |
| 32 | | 0.15 | 120.6 | 0.15 |
| 33 | | 0.15 | 126.2 | 0.16 |
| 34 | | 0.16 | 132.6 | 0.17 |
| 35 | | 0.17 | 140.2 | 0.18 |
| 36 | | 0.18 | 148.6 | 0.19 |
| 37 | | 0.19 | 158.8 | 0.18 |
| 38 | | 0.18 | 168.0 | 0.17 |
| 39 | | 0.17 | 176.4 | 0.16 |
| 40 | | 0.16 | 183.6 | 0.16 |
| 41 | | 0.16 | 189.4 | 0.17 |
| 42 | | 0.17 | 197.4 | 0.18 |
| 43 | | 0.18 | 206.2 | 0.18 |
| 44 | | 0.18 | 214.6 | 0.18 |
| 45 | | 0.18 | 224.0 | 0.17 |
| 46 | | 0.17 | 232.0 | 0.17 |
| 47 | | 0.17 | 239.0 | 0.18 |
| 48 | | 0.18 | 246.6 | 0.19 |
| 49 | | 0.19 | 255.8 | 0.18 |
| 50 | | 0.18 | 264.6 | 0.17 |
| Drum C Weight Empty → | | | 74.6 | |
| 51 | | 0.17 | 83.0 | 0.17 |
| 52 | | 0.17 | 91.6 | 0.16 |
| 53 | | 0.16 | 98.2 | 0.17 |
| 54 | | 0.17 | 105.2 | 0.18 |
| 55 | | 0.18 | 113.8 | 0.18 |
| 56 | | 0.18 | 122.6 | 0.18 |
| 57 | | 0.18 | 131.4 | 0.17 |
| 58 | | 0.17 | 138.8 | 0.17 |
| 59 | | 0.17 | 146.0 | 0.18 |
| 60 | | 0.18 | 154.8 | 0.17 |
| 61 | | 0.17 | 162.4 | 0.17 |
| 62 | | 0.17 | 170.2 | 0.17 |
| 63 | | 0.17 | 176.8 | 0.18 |
| 64 | | 0.18 | 185.4 | 0.18 |
| 65 | | 0.18 | 194.0 | 0.18 |
| 66 | | 0.18 | 202.4 | 0.18 |
| 67 | | 0.18 | 210.6 | 0.18 |
| 68 | | 0.18 | 220.0 | 0.17 |
| 69 | | 0.17 | 226.4 | 0.18 |
| 70 | | 0.18 | 234.2 | 0.18 |
| 71 | | 0.18 | 243.2 | 0.17 |
| 72 | | 0.17 | 250.8 | 0.17 |
| 73 | | 0.17 | 258.0 | 0.18 |
| 74 | | 0.18 | 266.0 | 0.18 |
| 75 | | 0.18 | 273.0 | 0.19 |
| Drum D Weight Empty → | | | 77.0 | |
| 76 | | 0.19 | 86.0 | 0.19 |
| 77 | | 0.19 | 94.4 | 0.19 |
| 78 | | 0.19 | 102.6 | 0.19 |
| 79 | | 0.19 | 111.4 | 0.18 |

TABLE 2-continued

| SHOT # | TIME | ACTUAL Sd | DRUM WT. | NEXT Sd |
|---|---|---|---|---|
| 80 | | 0.19 | 122.2 | 0.18 |

TABLE 3

| SHOT # | TIME | ACTUAL Sd | ACTUAL Si | DRUM WT. | NEXT Sd | NEXT Si | SAMPLE Concent. Dry Wt. | SHOT # |
|---|---|---|---|---|---|---|---|---|
| | Drum A Weight Empty → | | | 74.0 | | | | |
| 1 | 3.9 | 0.13 | 3.35 | 79.2 | 0.14 | 3.35 | | 1 |
| 2 | 7.7 | 0.14 | 3.35 | 84.4 | 0.15 | 3.35 | | 2 |
| 3 | 11.6 | 0.15 | 3.35 | 90.4 | 0.16 | 3.35 | 20.82 | 3 |
| 4 | 15.4 | 0.16 | 3.35 | 97.0 | 0.16 | 3.35 | | 4 |
| 5 | 19.3 | 0.16 | 3.35 | 103.6 | 0.16 | 3.35 | | 5 |
| 6 | 23.1 | 0.16 | 3.35 | 110.4 | 0.15 | 4.23 | | 6 |
| 7 | 27.8 | 0.16 | 4.23 | 117.0 | 0.15 | 4.23 | | 7 |
| 8 | 32.6 | 0.15 | 4.23 | 123.2 | 0.14 | 4.23 | 20.91 | 8 |
| 9 | 37.3 | 0.14 | 4.23 | 128.6 | 0.14 | 4.23 | | 9 |
| 10 | 42.0 | 0.14 | 4.23 | 133.8 | 0.14 | 4.23 | | 10 |
| 11 | 46.8 | 0.14 | 4.23 | 138.4 | 0.15 | 3.64 | | 11 |
| 12 | 50.9 | 0.15 | 3.64 | 143.4 | 0.16 | 3.64 | | 12 |
| 13 | 55.0 | 0.16 | 3.64 | 150.4 | 0.16 | 3.64 | 21.52 | 13 |
| 14 | 59.2 | 0.16 | 3.64 | 157.4 | 0.16 | 3.64 | | 14 |
| 15 | 63.3 | 0.16 | 3.64 | 164.0 | 0.16 | 3.64 | | 15 |
| 16 | 67.5 | 0.16 | 3.64 | 171.2 | 0.15 | 4.32 | | 16 |
| 17 | 72.3 | 0.15 | 4.32 | 176.8 | 0.15 | 4.32 | | 17 |
| 18 | 77.1 | 0.15 | 4.32 | 181.2 | 0.16 | 4.32 | 21.55 | 18 |
| 19 | 81.9 | 0.16 | 4.32 | 186.8 | 0.17 | 4.32 | | 19 |
| 20 | 86.7 | 0.17 | 4.32 | 193.0 | 0.17 | 4.32 | | 20 |
| 21 | 91.6 | 0.17 | 4.32 | 199.2 | 0.17 | 4.20 | | 21 |
| 22 | 96.3 | 0.17 | 4.20 | 205.4 | 0.17 | 4.20 | | 22 |
| 23 | 101.0 | 0.17 | 4.20 | 212.0 | 0.17 | 4.20 | 21.73 | 23 |
| 24 | 105.7 | 0.17 | 4.20 | 218.2 | 0.17 | 4.20 | | 24 |
| 25 | 110.4 | 0.17 | 4.20 | 225.0 | 0.16 | 4.20 | | 25 |
| | Drum B Weight Empty → | | | 74.4 | | | | |
| 26 | 115.1 | 0.16 | 4.20 | 81.6 | 0.15 | 3.35 | | 26 |
| 27 | 118.9 | 0.15 | 3.35 | 87.0 | 0.15 | 3.35 | | 27 |
| 28 | 122.8 | 0.15 | 3.35 | 92.8 | 0.15 | 3.35 | 21.34 | 28 |
| 29 | 126.6 | 0.15 | 3.35 | 99.0 | 0.15 | 3.35 | | 29 |
| 30 | 130.5 | 0.15 | 3.35 | 105.4 | 0.14 | 3.35 | | 30 |
| 31 | 134.3 | 0.14 | 3.35 | 110.8 | 0.14 | 0.18 | | 31 |
| 32 | 138.2 | 0.14 | 3.35 | 116.8 | 0.14 | 0.18 | | 32 |
| 33 | 142.0 | 0.14 | 3.35 | 122.0 | 0.15 | 0.18 | 21.57 | 33 |

TABLE 4

| SHOT # | TIME | ACTUAL Sd | ACTUAL Si | DRUM WT. | NEXT Sd | NEXT Si | SAMPLE Concent. Dry Wt. | SHOT # |
|---|---|---|---|---|---|---|---|---|
| | Drum A Weight Empty → | | | 74.2 | | | | |
| 1 | 3.99 | 0.11 | 3.49 | 74.8 | 0.12 | 3.49 | | 1 |
| 2 | 7.98 | 0.16 | 3.49 | 79.2 | 0.17 | 3.49 | | 2 |
| 3 | 11.97 | 0.17 | 3.49 | 86.8 | 0.18 | 3.49 | 26.89 | 3 |
| 4 | 15.96 | 0.18 | 3.49 | 96.2 | 0.17 | 3.49 | | 4 |
| 5 | 19.95 | 0.17 | 3.49 | 103.2 | 0.17 | 3.49 | | 5 |
| 6 | 23.94 | 0.17 | 3.49 | 109.8 | 0.17 | 3.82 | | 6 |
| 7 | 28.26 | 0.17 | 3.82 | 116.0 | 0.17 | 3.82 | | 7 |
| 8 | 32.58 | 0.17 | 3.82 | 122.0 | 0.17 | 3.82 | 22.46 | 8 |
| 9 | 36.90 | 0.17 | 3.82 | 128.8 | 0.16 | 3.82 | | 9 |
| 10 | 41.22 | 0.16 | 3.82 | 135.2 | 0.15 | 3.82 | | 10 |
| 11 | 45.54 | 0.15 | 3.82 | 139.8 | 0.16 | 2.74 | | 11 |
| 12 | 49.86 | 0.16 | 3.82 | 145.2 | 0.17 | 2.74 | | 12 |
| 13 | 53.10 | 0.17 | 2.74 | 151.2 | 0.18 | 2.74 | 22.49 | 13 |
| 14 | 56.34 | 0.18 | 2.74 | 159.4 | 0.17 | 2.74 | | 14 |
| 15 | 59.58 | 0.17 | 2.74 | 166.8 | 0.17 | 2.74 | | 15 |
| 16 | 62.82 | 0.17 | 2.74 | 173.6 | 0.16 | 2.73 | | 16 |
| 17 | 66.05 | 0.16 | 2.73 | 178.4 | 0.17 | 2.73 | | 17 |
| 18 | 69.28 | 0.17 | 2.73 | 185.2 | 0.17 | 2.73 | 20.25 | 18 |
| 19 | 72.51 | 0.17 | 2.73 | 191.6 | 0.17 | 2.73 | | 19 |
| 20 | 75.74 | 0.17 | 2.73 | 197.8 | 0.17 | 2.73 | | 20 |
| 21 | 78.97 | 0.17 | 2.73 | 205.0 | 0.17 | 2.86 | | 21 |
| 22 | 82.33 | 0.17 | 2.86 | 211.8 | 0.17 | 2.86 | | 22 |
| 23 | 85.69 | 0.17 | 2.86 | 218.4 | 0.17 | 2.86 | 19.15 | 23 |
| 24 | 89.05 | 0.17 | 2.86 | 224.8 | 0.17 | 2.86 | | 24 |
| 25 | 92.41 | 0.17 | 2.86 | 232.2 | 0.17 | 2.86 | | 25 |

What is claimed is:

1. A method for controlling intermittently discharged centrifuges to achieve a solid-liquid separation, the centrifuge receiving a feed having a total mass $M_1$ and a solids concentration $s_1$, the feed being delivered to the centrifuge at a feed rate Q within a conventional feed rate range for the centrifuge, the centrifuge discharging a centrate having a mass $M_2$ and a solids concentration $s_2$ and discharging a concentrate having a mass $M_3$ and a solids concentration $s_3$, the discharges of the concentrate occurring as intermittent discharges having a shot mass $\mu_i$ at intermittent time intervals lasting for shot duration $t_d$ and being spaced apart by shot intervals $t_i$, the method comprising the steps of:

a. measuring the mass $M_1$ of the feed;
b. measuring the solids concentration $s_1$ of the feed;
c. determining values for the two variables in one of the following sets of variables:
   i. the centrate solids concentration $s_2$ and the concentrate solids concentration $s_3$;
   ii. the centrate solids concentration $s_2$ and the centrate mass $M_2$;
   iii. the centrate solids concentration $s_2$ and the concentrate mass $M_3$;
   iv. the concentrate solids concentration $s_3$ and the centrate mass $M_2$; and
   v. the concentrate solids concentration $s_3$ and the concentrate mass $M_3$;
d. establishing a target shot mass $\mu_t$, an initial shot duration $t_{d,\ initial}$, and an initial feed flow rate $Q_{initial}$;
e. establishing an initial shot interval $t_i$;
f. initiating operation of the centrifuge;
g. during operation of the centrifuge, measuring the value of one or more of the variables $M_2$, $M_3$, $s_2$ and $s_3$;
h. using the measured value of the one or more variables of step g to determine a modification to at least one of said shot duration $t_d$, said shot interval $t_i$ and said feed rate Q; and
i. in response to step h, controlling at least one of said shot duration, said shot interval and said feed rate.

2. The method of claim 1 in which step h comprises comparing one or more measured values of the variables of step g with the determined values of the corresponding variables of step c, and step i comprises controlling at least one of said shot duration, said shot interval and said feed rate to bring the measured value of the variable closer to the determined value of the variable.

* * * * *